(12) United States Patent  
Hetherington et al.

(10) Patent No.: US 8,985,277 B2  
(45) Date of Patent: Mar. 24, 2015

(54) CASE WITH INTEGRAL LUBRICANT SCAVENGE PASSAGE

(75) Inventors: Curt R. Hetherington, Newington, CT (US); Stephen H. Mattia, Middletown, CT (US); Bradley J. Sabo, Cincinnati, OH (US)

(73) Assignee: United Technologies Corporation, Hartford, CT (US)

( * ) Notice: Subject to any disclaimer, the term of this patent is extended or adjusted under 35 U.S.C. 154(b) by 360 days.

(21) Appl. No.: 13/562,719

(22) Filed: Jul. 31, 2012

(65) Prior Publication Data

US 2014/0182972 A1    Jul. 3, 2014

(51) Int. Cl.  
    *F02C 7/06*    (2006.01)  
    *F01D 25/18*    (2006.01)

(52) U.S. Cl.  
    CPC . *F02C 7/06* (2013.01); *F01D 25/18* (2013.01); *F05D 2260/602* (2013.01); *F05D 2260/98* (2013.01); *Y02T 50/671* (2013.01)  
    USPC ............................................. 184/6.11

(58) Field of Classification Search  
    CPC ....... F01D 25/18; F02C 7/06; F05D 2260/98; F05D 2260/602  
    USPC ................................ 184/6.11, 6.12  
    See application file for complete search history.

(56) References Cited

U.S. PATENT DOCUMENTS

| | | | |
|---|---|---|---|
| 4,570,947 A | 2/1986 | Smith | |
| 4,722,666 A | 2/1988 | Dennison et al. | |
| 5,107,676 A | 4/1992 | Hadaway et al. | |
| 6,996,968 B2 | 2/2006 | Peters et al. | |
| 7,373,780 B2 | 5/2008 | Peters et al. | |
| 7,455,150 B1 | 11/2008 | Gekht et al. | |
| 2005/0199445 A1 | 9/2005 | Zalewski et al. | |
| 2008/0134657 A1* | 6/2008 | DiBenedetto et al. | ....... 60/39.08 |
| 2010/0038173 A1 | 2/2010 | Munson | |
| 2010/0275572 A1 | 11/2010 | Durocher et al. | |

FOREIGN PATENT DOCUMENTS

GB        2366602 B        3/2005  
WO   2010007220 A2        1/2010

OTHER PUBLICATIONS

The International Search Report mailed Oct. 7, 2013 for International Application No. PCT/US2013/051637.

* cited by examiner

*Primary Examiner* — William E Dondero  
*Assistant Examiner* — Robert T Reese  
(74) *Attorney, Agent, or Firm* — Kinney & Lange, P.A.

(57) ABSTRACT

A case comprises a radially inner case hub, a radially outer case section with an outer wall, a plurality of circumferentially distributed struts extending radially between the inner hub and the outer case section, and a lubricant scavenge passage disposed circumferentially apart from a bottom dead center (BDC) position of the case. The lubricant scavenge passage includes an inner scavenge section extending radially through a first one of the plurality of struts.

25 Claims, 6 Drawing Sheets

CASE WITH INTEGRAL LUBRICANT SCAVENGE PASSAGE

BACKGROUND

The described subject matter relates generally to cases for gas turbine engines, and more specifically to those having lubricant passages formed into the cases.

Cases and housings for gas turbine engines are used in different ways to support and protect varying parts of the engine. To ensure circulation and recovery of lubricant for the engine components, feed ports are formed through the case. Oil scavenge ports are typically disposed at a bottom dead center position of the case to maximize the use of gravity in collecting the lubricant and returning it to the main oil system.

SUMMARY

A case comprises a radially inner case hub, a radially outer case section with an outer wall, a plurality of circumferentially distributed struts extending radially between the inner hub and the outer case section, and a lubricant scavenge passage disposed circumferentially apart from a bottom dead center (BDC) position of the case. The lubricant scavenge passage includes an inner scavenge section extending radially through a first one of the plurality of struts.

A lubricant scavenge passage comprises an inlet scoop, a scavenge outlet port, an inner scavenge section, and an outer scavenge section. The inlet scoop is formed on a radially inner case wall. The scavenge outlet port is disposed outward of a radially outer case wall. The inner scavenge section extends between the inlet scoop and the outer case wall. The outer scavenge section, in fluid communication with the inner scavenge section, extends between the outer case wall and the scavenge outlet port. The lubricant scavenge passage is disposed circumferentially apart from a bottom dead center (BDC) position of the case.

DETAILED DESCRIPTION

Figure 1:
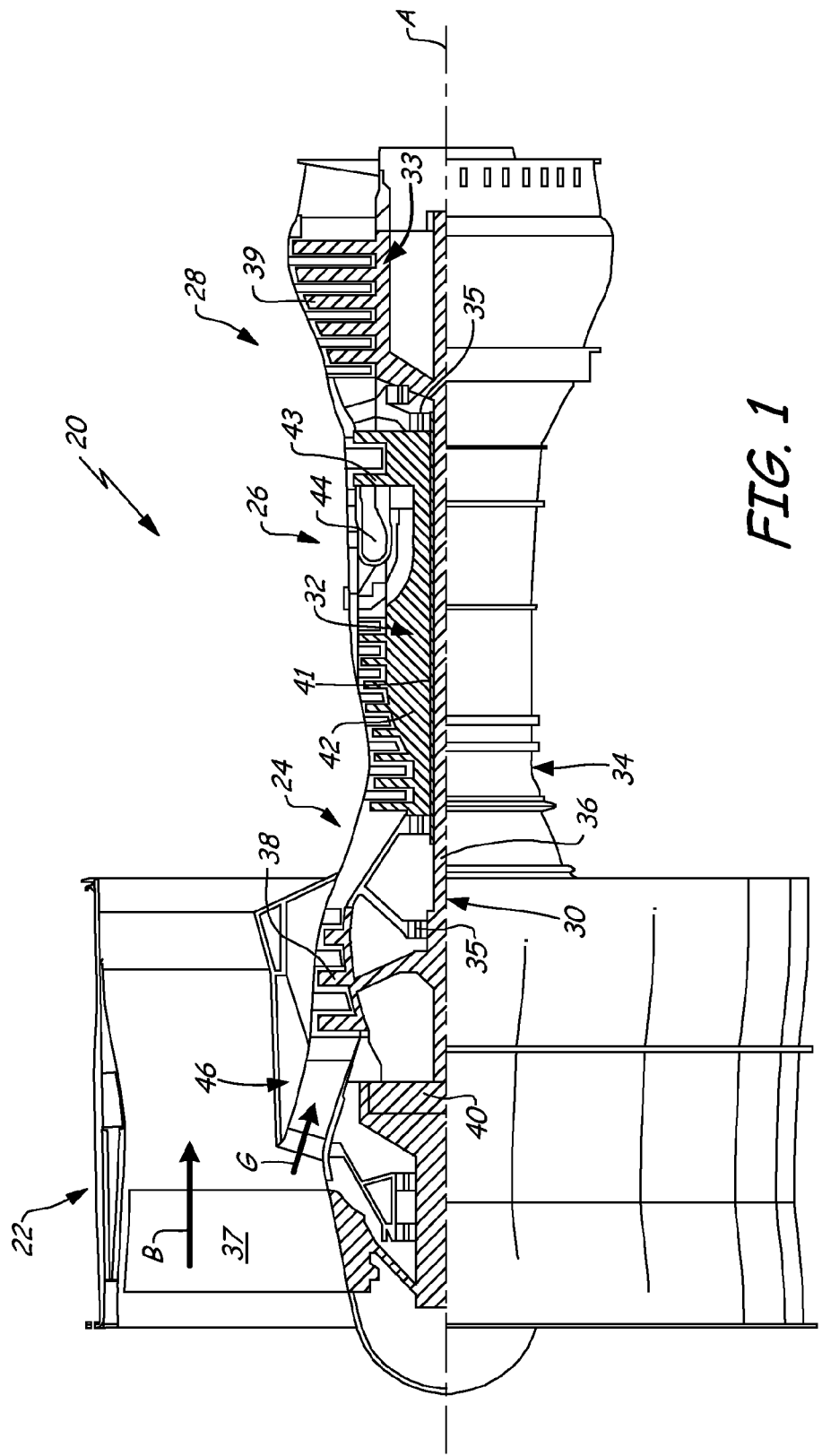
FIG. 1 is a schematic cross-sectional view of an example turbofan gas turbine engine according to the present description.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path G where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 34 via several bearing systems 35. It should be understood that various bearing systems 35 at various locations may alternatively or additionally be provided.

Low speed spool 30 generally includes inner shaft 36 that connects fan 37 and low pressure (or first) compressor section 38 to low pressure (or first) turbine section 39. Inner shaft 36 drives fan 37 through a speed change device, such as geared architecture 40, to drive fan 37 at a lower speed than low speed spool 30. High-speed spool 32 includes outer shaft 41 that interconnects high pressure (or second) compressor section 42 and high pressure (or second) turbine section 43. Inner shaft 36 and outer shaft 41 are concentric and rotate via bearing systems 35 about engine central longitudinal axis A.

Combustor 44 is arranged between high pressure compressor 42 and high pressure turbine 43. In one example, high pressure turbine 43 includes at least two stages to provide a double stage high pressure turbine 43. In another example, high pressure turbine 43 includes only a single stage. As used herein, a "high pressure" compressor or turbine experiences a higher pressure than a corresponding "low pressure" compressor or turbine.

The example low pressure turbine 39 has a pressure ratio that is greater than about 5. The pressure ratio of the example low pressure turbine 39 is measured prior to an inlet of low pressure turbine 39 as related to the pressure measured at the outlet of low pressure turbine 39 prior to an exhaust nozzle. The core airflow G is compressed by low pressure compressor 38 then by high pressure compressor 42 mixed with fuel and ignited in combustor 44 to produce high speed exhaust gases that are then expanded through high pressure turbine 43 and low pressure turbine 39. Reducing or eliminating the number of vanes in low pressure turbine 39, such as through use of vanes in a mid-turbine frame disposed between high pressure turbine 43 and low pressure turbine 39 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 40 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 38. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(T_{ram}° R)/518.7)^{0.5}]$. The "Low corrected fan tip speed", as disclosed herein according to one non-limiting embodiment, is less than about 1150 ft/second.

The example gas turbine engine includes fan 37 that comprises in one non-limiting embodiment less than about 26 fan blades. In another non-limiting embodiment, fan section 22 includes less than about 20 fan blades. Moreover, in one disclosed embodiment low pressure turbine 39 includes no more than about 6 turbine rotors schematically indicated at 33. In another non-limiting example embodiment low pressure turbine 39 includes about 3 turbine rotors. A ratio between number of fan blades 37 and the number of low pressure turbine rotors is between about 3.3 and about 8.6. The example low pressure turbine 39 provides the driving power to rotate fan section 22 and therefore the relationship between the number of turbine rotors at 33 in low pressure turbine 39 and number of blades in fan section 22 disclose an example gas turbine engine 20 with increased power transfer efficiency.

In this example, fan intermediate case (FIC) 46 surrounds and supports a portion of geared architecture 40 proximate its interface with low speed spool 30. Geared architecture 40 can include but is not limited to the epicyclic gear train described above. Geared architecture 40 can be provided with oil through one or more feed lines (not shown) proximate axial center line A. As lubricant is circulated to lubricate and cool the gear arrangement in architecture 40, the used lubricant is generally thrown radially outward toward FIC 46. It is then scavenged from an inside portion of FIC 46 and returned back radially through FIC 46 to one or more main engine oil systems for filtering, cooling, and recirculation. One non-limiting example embodiment of FIC 46 is shown and described below.

Figure 2A:
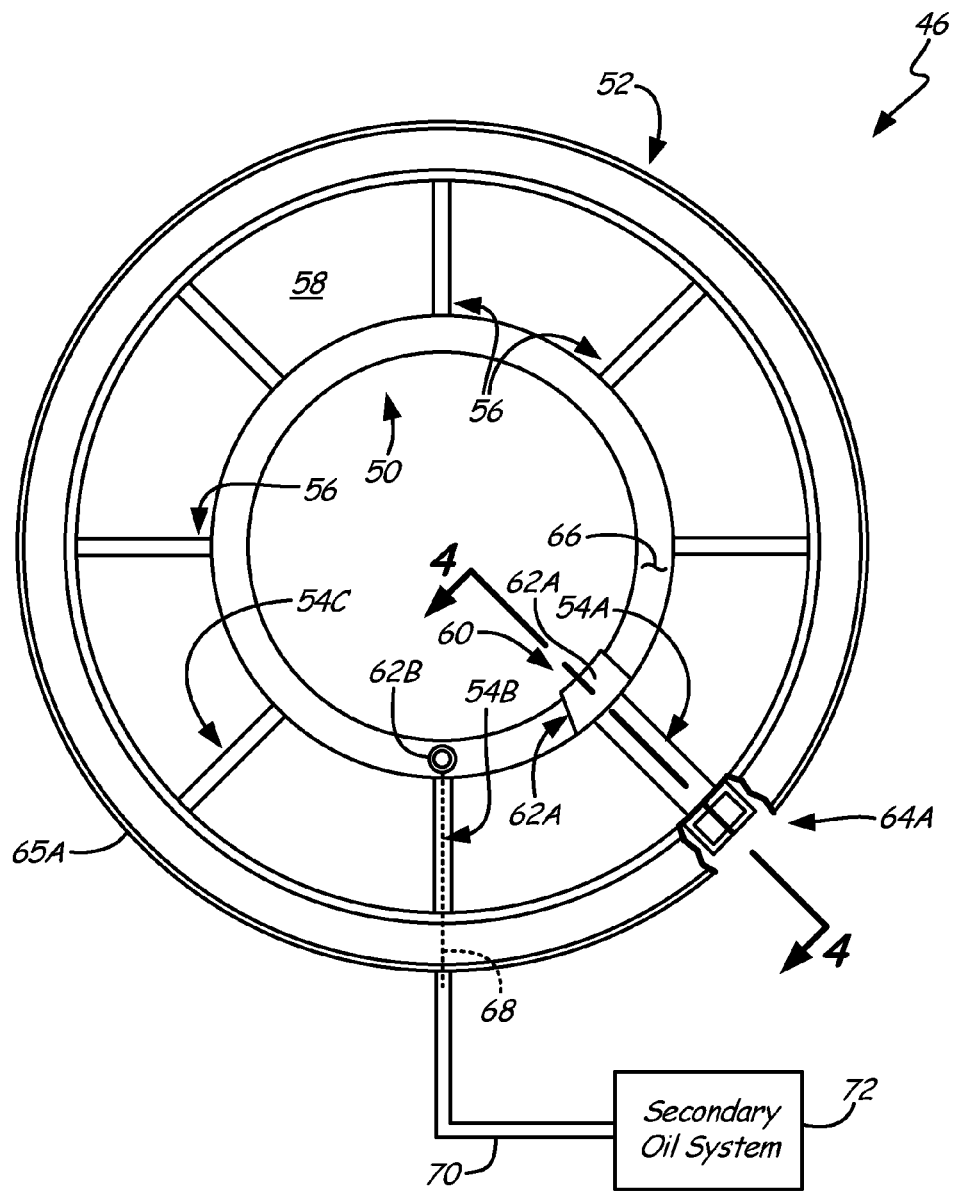
FIG. 2A shows a forward elevation view of a case for the example turbofan gas turbine engine.

FIG. 2A shows an example embodiment of FIC 46, and includes inner case hub 50, outer case section 52, first lower strut 54A, second lower strut 54B, third lower strut 54C, upper struts 56, annular flow passage 58, lubricant scavenge passage 60, first inner port 62A, second inner port 62B, first outer port 64A, forward outer flange 65A, inner hub surface 66, bottom dead center (BDC) case position 68, secondary oil lines 70, and secondary oil system 72.

FIC 46, viewed from an engine-forward end toward an engine-aft end, includes radially outer case section 52 disposed coaxially outward of inner case hub 50, with a plurality of circumferentially distributed struts extending radially therebetween. In this example, the plurality of circumferentially distributed struts includes respective first, second, and third lower struts 54A, 54B, 54C, as well as upper struts 56. Core airflow G is drawn into the engine core by propulsion fan 37 (shown in FIG. 1), through annular flow passage 58 between inner case hub 50 and outer case section 52, and into low pressure compressor 38 (also shown in FIG. 1). First lower strut 54A includes a generally radially extending inner bore (not visible in FIG. 2A). This inner bore through first lower strut 54A forms an inner portion of lubricant scavenge passage 60, which extends generally radially through FIC 46 between a first inner port 62A and a first outer port 64A. The inner bore may be defined by one or more outer walls of first lower strut 54A, or alternatively may be defined by one or more additional internal walls (not shown in FIG. 2A). First inner port 62A can be for example, an oil scoop or other suitable drain formed on inner case hub 50 for capturing a portion of lubricant flowing along hub inner surface 66 as described in the examples below. First outer port 64A can include, for example, a scavenge outlet port or other suitable fluid port disposed on a radially outward portion of outer case section 52. A portion of forward outer flange 65A is cut away to show an example of an outer section of lubricant scavenge passage 60 external to outer case 52. Additional details of lubricant scavenge passage 60 are shown and described with respect to later figures.

As seen here, lubricant scavenge passage 60, including first lower strut 54A is disposed circumferentially apart from a bottom dead center (BDC) position 68 of FIC 46. It will be recognized that BDC position 68 refers generally to the lowest circumferential position of FIC 46, or other generally cylindrical engine component structure, when engine 20 is in a static or a steady cruising state. Thus in certain embodiments, lubricant scavenge passage 60 can additionally or alternatively be formed through third lower strut 54C, in a manner similar to first lower strut 54A, as will be described below.

In some case designs, such as those used for bearing compartment housings, most or all of the used lubricant is collected by a scavenge drain disposed proximate the BDC position of the case or housing. In certain of these designs, the scavenge drain proximate BDC of the housing or case may include an oil scoop also in approximately the same circumferential position. Some designs have this opening circumferentially offset by several degrees from BDC in order to accommodate a relatively sharp right-angled turn of the scavenged lubricant between the scoop into the scavenge drain. In these existing designs, however, the BDC scavenge drain encompasses the BDC position of the housing to maximize use of gravity in scavenging and returning lubricant to the main lubricant system during normal operation. However, this complicates the ability to utilize the prior designs to provide a separate sump or other source of lubricant at the BDC case position for components requiring use of a secondary or emergency oil system.

As described, lubricant flow passage 60 makes use of a bore formed through first lower strut 54A, disposed circumferentially apart from BDC case position 68 to remove lubricant from within inner case hub 50 to a primary engine lubrication system disposed outside FIC 46. Further, in certain embodiments, second lower strut 54B, disposed proximate BDC position 68 can be hollow, and include a bore open to inner hub surface 66 via second inner port 62B. In certain of those embodiments, second lower strut 54B provides FIC 46 with a gravity fed sump in addition to lubricant scavenge passage 60. In yet certain of those embodiments, second outer port 64B (shown in FIG. 2B) provides fluid communication through one or more secondary oil lines 70 between the gravity fed sump (disposed through second lower strut 54B) and a secondary oil system 72 (shown schematically) operational to lubricate geared architecture 40, such as during windmilling of propulsion fan 37 (shown in FIG. 1).

The number and geometry of the struts circumferentially distributed between inner case hub 50 and outer case section 52 can be selected to provide a balance between weight and structural requirements of the engine. Thus, it will be recognized that the exact circumferential position of first lower strut 54A, and more generally, the position of lubricant passage 60 relative to BDC case position 68 will vary accordingly. In certain embodiments, first lower strut 54A (and thus lubricant flow passage 60) is disposed between about 25° and about 65° apart from the BDC position 68. This range generally accommodates circumferential distribution of a total of between six and twelve radially extending struts while ensuring that first scavenge strut 54A is disposed sufficiently apart from BDC position 68 to accommodate an optional hollow embodiment of second lower strut 54B disposed proximate BDC case position 68. In certain of those embodiments, first lower strut 54A and lubricant flow passage 60 are disposed between about 40° and about 50° apart from BDC case position 68. This accommodates circumferential distribution of eight radially extending struts as shown and described in this illustrative example. It will be recognized that one or more of the remaining struts 54B, 54C, and/or 56 may also be hollow, either as a weight saving approach, and/or to accommodate other functions not explicitly described here that fall outside the scope of this disclosure. It will also be recognized that one or more struts may include an outer airfoil surface, or other aerodynamic shape to further condition air flowing into the engine core toward low pressure compressor 38.

Figure 2B:
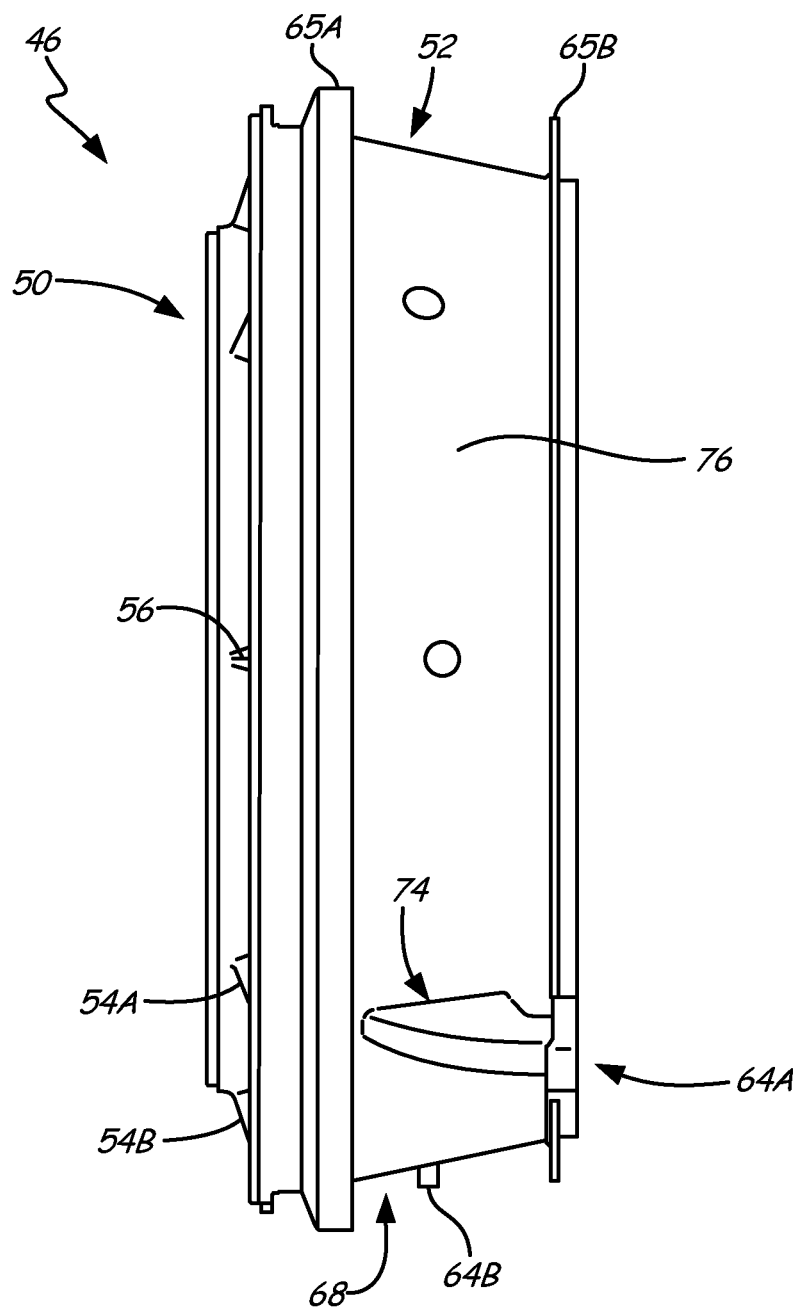
FIG. 2B depicts a side elevation view of the case shown in FIG. 2A.

FIG. 2B is a side view of FIC 46 and also includes inner case hub 50, outer case section 52, first lower strut 54A, second lower strut 54B, upper struts 56, first outer port 64A, second outer port 64B, forward outer flange 65A, aft outer flange, 65B, bottom dead center (BDC) case position 68, outer scavenge section 74, and outer case surface 76.

Figure 3B:
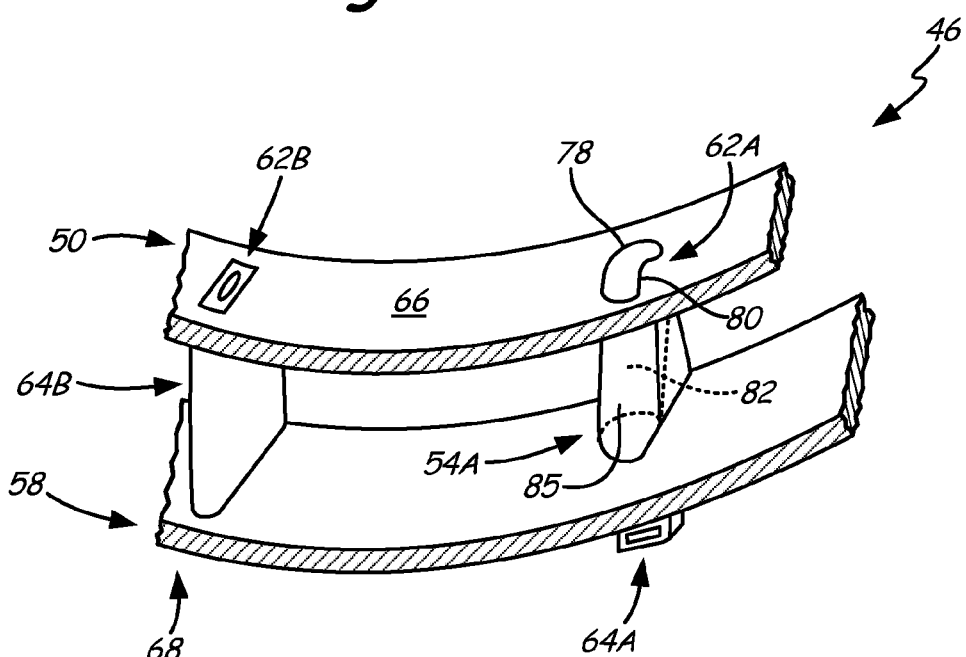
FIG. 3B includes a second sectional view of a second portion of the case with the lubricant scavenge passage.
Figure 4:
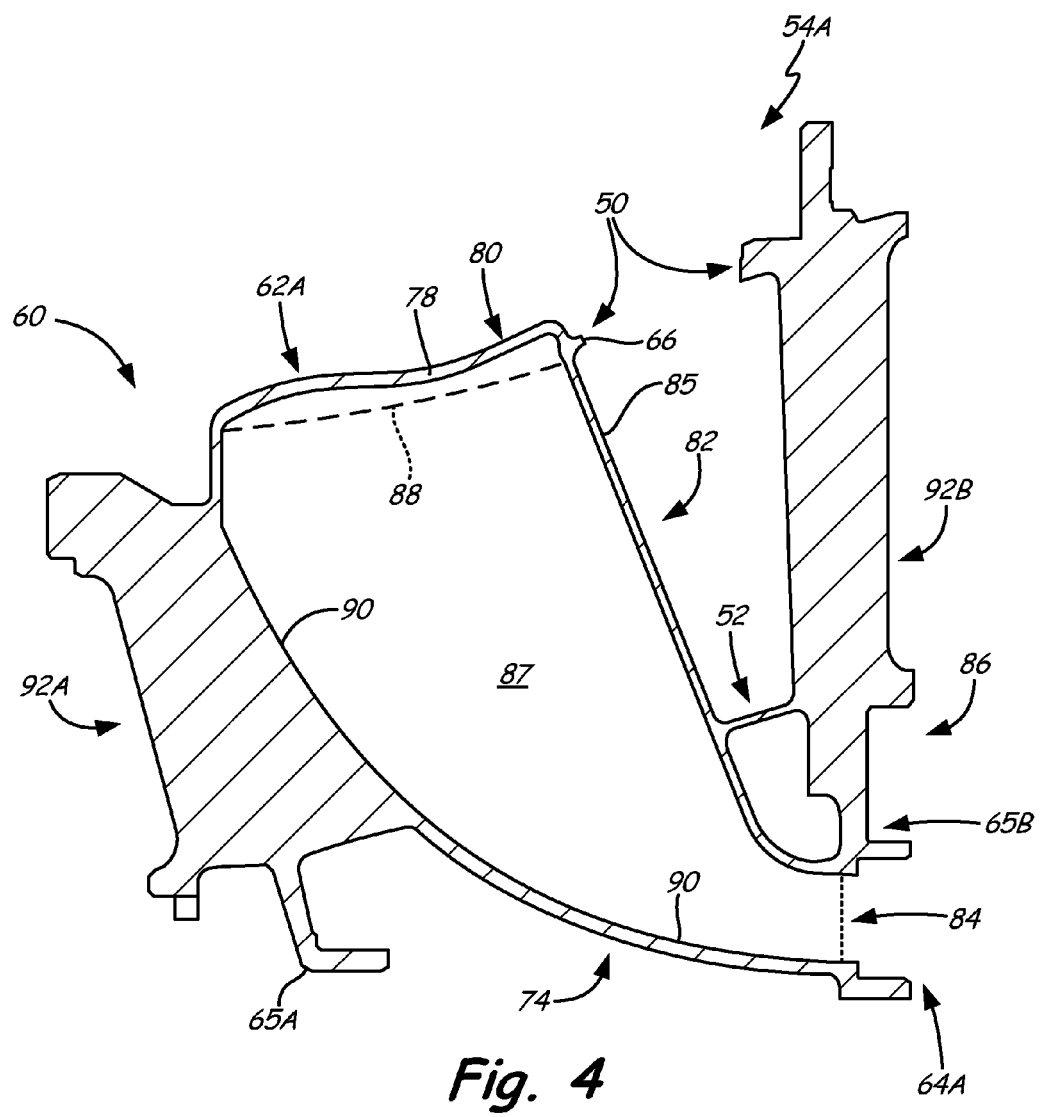
FIG. 4 shows a section of the lubricant passage taken across line 4-4 of FIG. 2A.

As noted with respect to FIG. 2A, lubricant scavenge passage 60 includes an inner scavenge section (not numbered in FIG. 2A and 2B) extending generally radially through annular flow passage 58 via a bore or other similar conduit formed into first lower strut 54A Lubricant scavenge passage 60 also includes outer scavenge section 74, an example of which is shown in FIG. 2B as being disposed radially outward from outer case section 52. Outer scavenge section 74 is in fluid communication with the inner scavenge section as seen below, and can be integrally formed with outer case wall 76. Together the two scavenge sections of lubricant scavenge passage 60 redirect scavenged lubricant flow from first inner port 62A (shown in FIG. 2A) to first outer port 64A. Certain embodiments of lubricant scavenge passage 60 can include an internal low-loss geometry, thereby reducing scavenge pumping requirements. A portion of this passage geometry can be seen generally as part of outer scavenge section 74 in FIG. 2B. A more detailed example, however, is shown in FIGS. 3B and 4.

In certain non-limiting embodiments, FIC 46 can be integrally cast using any conventional process such as die casting or investment casting. Directly casting one or both scavenge sections of lubricant scavenge passage 60 into FIC 46 case allows for more precise geometry of the passage and reduces the complexity of machining and assembly. In certain embodiments, first outer port 64A can discharge scavenged oil toward one or both of a forward axially facing side or aft axially facing side of FIC 46. As shown in this example, first outer port 64A can optionally be incorporated into a portion of aft outer case flange 65B. Additionally or alternatively, first outer port 64A can optionally be incorporated into forward outer case flange 65A. In these and other examples, no internal oil lines, or other hardware are required to transport scavenged oil between first inner port 62A and first outer port 64A. Further, an integrally cast passage as shown in this example allows the discharge opening (shown in FIGS. 3B and FIG. 4), with the main oil line attachment bosses, etc., to be machined as part of the same process as the remainder of one or both outer flanges 65A, 65B, also reducing manufacturing and assembly requirements.

Figure 3A:
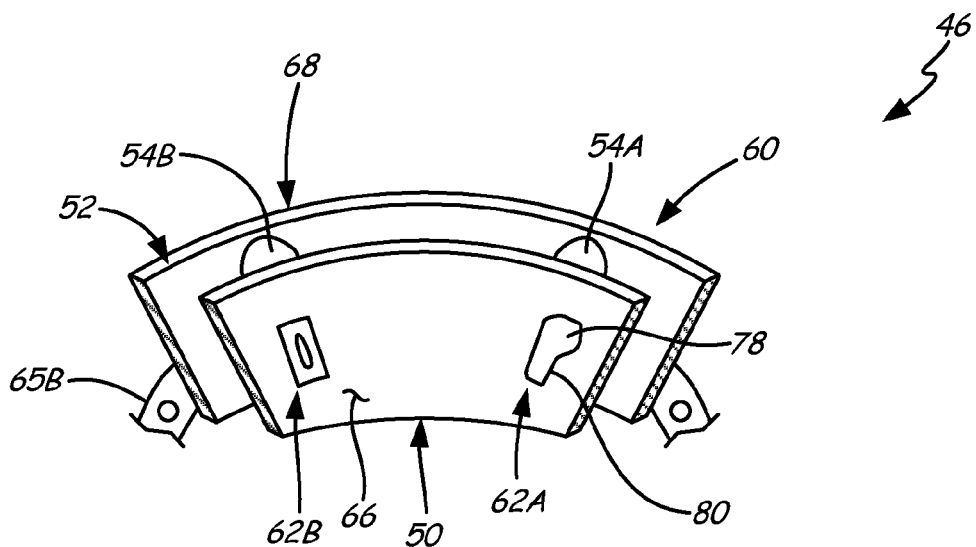
FIG. 3A includes a first sectional view of a portion of the case with the lubricant scavenge passage.

FIG. 3A shows a partial circumferential section viewed radially outward from the center of FIC 46, and also includes inner case hub 50, outer case section 52, first lower strut 54A, second lower strut 54B, lubricant scavenge passage 60, first inner port 62A, second inner port 62B, aft outer flange 65B, inner hub surface 66, bottom dead center (BDC) case position 68, scoop 78, and scoop entrance 80.

As noted above with respect to FIG. 1, FIC 46 can include inner case hub 50 configured to support at least a portion of geared architecture 40. Geared architecture 40 may be an epicyclic fan gear system. The epicylclic gear system or other geared architecture 40 can include one or more collection gutters (not shown) that collect oil from the areas between and around the meshing gears. The gutter(s) then eject a majority of the outwardly flowing used lubricant toward inner hub surface 66, which includes first inner port 62A to communicate lubricant from inside inner hub 50 out through outer case section 52 via first lower strut 54A.

Most of the recovered lubricant clings to inner hub surface 66 as it drains downward via gravity toward BDC case position 68. A portion of this lubricant clinging to inner hub surface 66 enters first inner port 62A via scoop 78. Oil scoop 78 is arranged generally tangential to inner hub surface 66, with scoop entrance 80 facing circumferentially away from BDC position 68. This provides an opportunity to capture oil before draining all the way to the base of FIC 46. In certain embodiments, such as but not limited to the example embodiment shown in FIGS. 3A and 3B, scoop 78 extends axially across most but not all of inner hub surface 66. In these embodiments, some of the recovered lubricant at inner hub surface 66 bypasses first inner port 62A and can then enter optional second inner port 62B.

As noted above, second inner port 62B can optionally be open to a radial bore formed in second lower strut MB. As shown in FIGS. 2A and 2B, optional second port 62B can communicate lubricant to second lower strut MB, which may optionally serve as part of a sump cavity and/or feed pipe for secondary oil system 72.

FIG. 3B shows a similar circumferential section as seen in FIG. 3A, viewed axially from an engine-aft side of FIC 46. FIG. 3B also includes inner case hub 50, outer case section 52, first lower strut 54A, second lower strut 54B, lubricant scavenge passage 60, first inner port 62A, second inner port 62B, first outer port 64A, inner hub surface 66, bottom dead center (BDC) case position 68, scoop 78, scoop entrance 80, inner scavenge passage 82, discharge opening 84, and internal strut wall 85.

Unlike FIG. 3A, FIG. 3B has a forward and aft facing portions of FIC 46 (including respective forward and aft outer flanges 65A, 65B) cut away from FIC 46 to better illustrate one non-limiting example of lubricant scavenge passage 60. Lubricant scavenge passage 60 can include an internal geometry incorporating an inner scavenge section 82 into first lower strut 54A. Portions of radial support walls for strut 54A are normally disposed aft of inner scavenge section 82, but have also been removed to better illustrate inner scavenge section 82, along with internal strut wall 85, extending radially and axially between inner case hub 50 and outer case section 52.

It can be seen here, in conjunction with FIG. 4, that inner scavenge section 82 redirects used lubricant that tangentially enters first inner port 62A (e.g., via scoop opening 80) toward first outer port 64A which can include discharge opening 84 on an axial facing side of FIC 46. First outer port 64A can be provided, via machining or other manufacturing processes, mating features such as fittings and/or fasteners disposed around discharge opening 84 for removably securing a main lubricant return line (not shown) to FIC 46. In this example, these mating features could be formed, for example, during machining of aft outer flange 65A.

FIG. 4 is a cross-section taken through first lower strut 54A, across line 4-4 of FIG. 2. FIG. 4 also includes inner case hub 50, outer case section 52, lubricant scavenge passage 60, first inner port 62A, first outer port 64A, forward outer flange 65A, aft outer flange 65B, inner hub surface 66, outer scavenge section 74, scoop 78, scoop entrance 80, inner scavenge passage 82, discharge opening 84, strut internal wall 85, axially facing case surface 86, scavenge conduit 87, inner port floor 88, scavenge flow surface 90, forward strut support wall 92A, and aft strut support wall 92B.

As previously described, first lower strut 54A is disposed circumferentially away from BDC case position 68, and encompasses inner scavenge section 82 of lubricant scavenge passage 60. Outer scavenge section 74 is disposed outward from outer case section 52, and includes discharge opening 84 proximate axially facing case surface 86. Outer scavenge section 74 joins inner scavenge section 82 in fluid communication, defining a lubricant scavenge conduit 87 for the scavenged lubricant extending between first inlet port 62A and first outlet port 64A.

A floor 88 of first inner port 62A, in fluid communication with inner hub wall 66, is shown via dashed line just below scoop 78. The cross-section across line 4-4 is taken downstream of scoop opening 80 and is thus not visible in FIG. 4, but the radial position of opening 80 is generally around inner port floor 88. Inner port floor 88 may also be sloped relative to the remainder of inner hub wall 66 to direct flow into conduit 87 toward lubricant scavenge flow surface 90.

Figure 5:
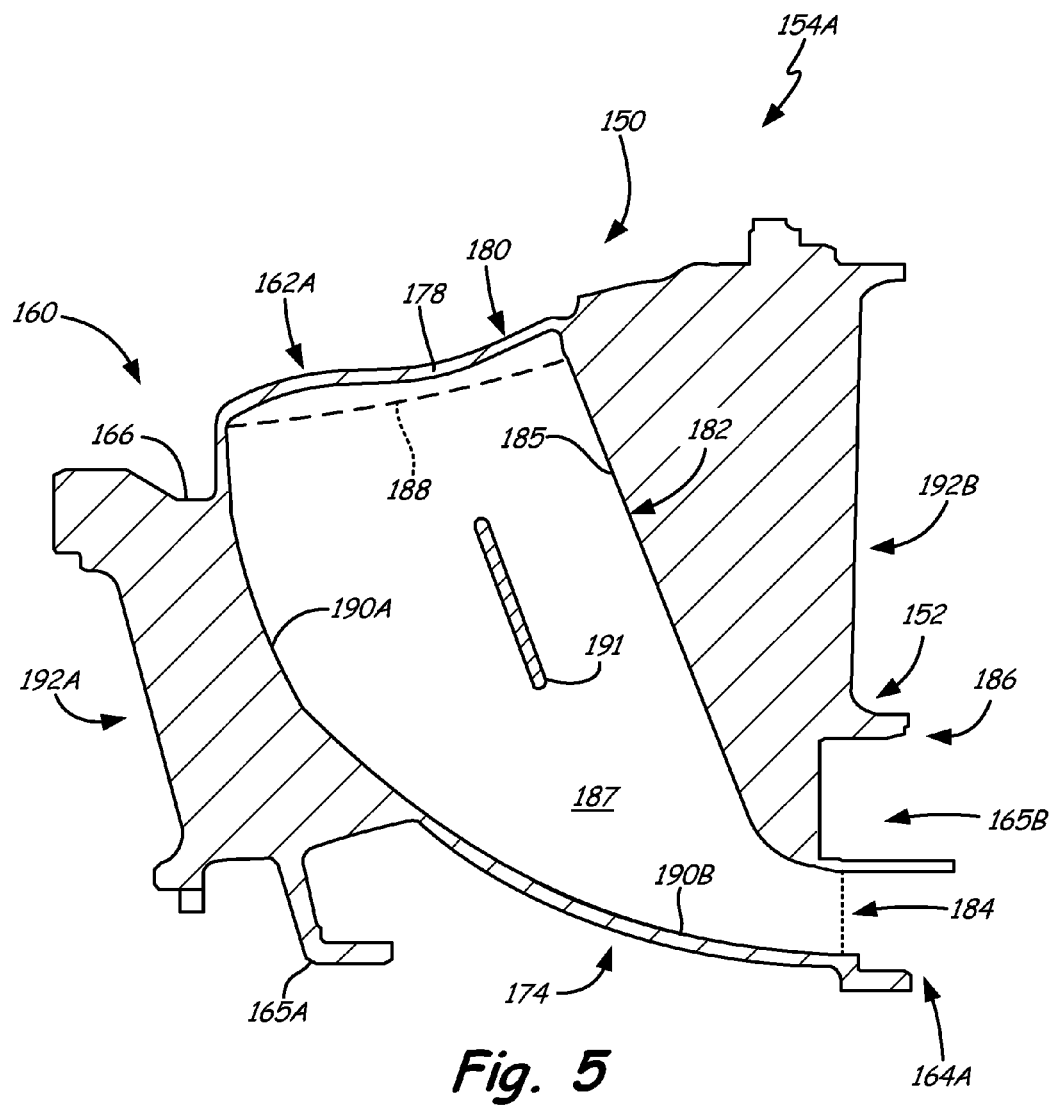
FIG. 5 shows a section of an alternative embodiment of a lubricant passage.

Flow surface 90 can comprise an upper scavenge flow surface with a first curvature radius formed through inner scavenge section 82. As seen in more detail in the alternative embodiment shown in FIG. 5, flow surface 90 can also comprise a lower scavenge flow surface with a second curvature radius formed through outer scavenge section 74. Upper and lower portions of lubricant scavenge flow surface 90 can define a contiguous flow surface between first inner port 62A and first outer port 64A. While surface 90 is contiguous, the first and second curvature radii of each surface may or may not be equal. FIG. 4 shows equal curvature radii of the upper and lower portions to define an effective curvature radius of lubricant scavenge flow surface 90. FIG. 5 below shows an alternative embodiment with different first and second curvature radii.

The overall effective curvature radius of flow surface 90 gently transforms the scavenge oil flow direction from tangential to radial to axial flow, while minimizing flow separation. Sharper turns and discontinuities in the flow surface can cause separation of more of the lubricant from the flow surface, with attendant frictional losses and pressure drops. Thus by minimizing flow separation, scavenged oil can retain more overall momentum, reducing pumping requirements once it has left FIC 46. The effective curvature radius of flow surface 90 can be increased in part by providing both inner scavenge section 82 through first lower strut 54A, as well as outer scavenge section disposed outward of an outer case wall, such as outer case section 52. In certain embodiments, the effective curvature radius of flow surface 90 is greater than the actual radius of inner case hub 50.

Strut 54A can be structural supported via forward strut support wall 92A and aft strut support wall 92B. Aft support wall 92B was cut away in FIG. 3B, along with forward and aft outer flanges 65A, 65B and other elements disposed along axial FIC face 86, to better illustrate inner scavenge section 82 and inner strut wall 85.

In certain embodiments, scavenge conduit can be integrally cast, including formation of flow surface 90. In investment casting, the shape of the passage can be defined by a ceramic or refractory core corresponding to the shape of the passage. In die casting, the passage flow surfaces are defined by the casting die.

FIG. 5 is an alternative embodiment showing a cross-section of an integrally cast strut 154A. FIG. 5 also includes inner case hub 150, outer case section 152, lubricant scavenge passage 160, first inner port 162A, first outer port 164A, forward outer flange 165A, aft outer flange 165B, inner hub surface 166, outer scavenge section 174, scoop 178, scoop entrance 180, inner scavenge passage 182, discharge opening 184, strut internal wall 185, axially facing case surface 186, scavenge conduit 187, inner port floor 188, upper scavenge flow surface 190A, lower scavenge flow surface 190B, scavenge conduit divider 191, forward strut support wall 192A, and aft strut support wall 192B.

As previously described, first lower strut 154A can encompass inner scavenge section 182 of alternative lubricant scavenge passage 160. Outer scavenge section 174 is disposed outward from outer case section 152, and includes discharge opening 184 proximate axially facing case surface 186. Contiguous lubricant scavenge conduit 187 passes recovered lubricant between first inlet port 162A and first outlet port 164A. Floor 188 of first inner port 162A can also be in fluid communication with inner hub wall 166 just below scoop 178. As above, inner port floor 188 may also be sloped relative to the remainder of inner hub wall 166 to direct flow into conduit 187. Similarly, strut 154A can be structural supported via forward strut support wall 192A and aft strut support wall 192B. In this example, aft strut support wall 192B is shown as being integral with strut internal wall 185, whereas in FIG. 4, these two elements were separated by a hollow cavity.

Scavenge flow conduit 187 includes a scavenge flow surface comprising upper scavenge flow surface 190A having a first curvature radius, and lower scavenge flow surface 190B, having a second curvature radius. Similar to FIG. 4, upper and lower surfaces 190A, 190B are contiguous through inner scavenge section 182 and outer scavenge section 174. However, as seen in FIG. 5, respective first and second curvature radii of surfaces 190A, 190B need not be equal to define a single effective curvature radius. In this alternative example embodiment, the second curvature radius of lower scavenge flow surface 190B is less than the first curvature radius of upper scavenge flow surface 190A.

To gently transform the scavenge oil flow direction from tangential to radial to axial flow, while still minimizing flow separation, scavenge flow conduit 187 can also include scavenge conduit divider 191 extending through at least a portion of conduit 187 between first inner port 162A and first outer port 164A. Scavenge conduit divider 191 may be integrally cast into conduit 187 and may extend circumferentially between inner walls of strut 154A. Scavenge conduit divider 191 can provide additional flow surfaces for scavenged oil during transition from first inner port 162A to first outer port 164A to reduce sharp tangential to radial to axial momentum changes. These changes may be caused by a steep radial entrance angle between scoop 178 and upper scavenge flow surface 190A when the first curvature radius of upper scavenge flow surface 190A is made larger to accommodate more constrained radial dimensions of passage 160. These constraints may make impractical a substantially constant effective curvature radius for the scavenge flow surface such as was shown in FIG. 4.

Even when the body of the scavenge passage is integrally cast, it may be an artifact of particular casting techniques that the openings will need to be machined out. By positioning the outlet proximate the outer flange, the outlet port may be machined along with the case attachment features around the remainder of the flange. Features specific to attachment of a return line may be machined at this time as well. Other openings such as those around the first and second inner ports may additionally be finish machined after casting.

In these example embodiments, FIC 46 is shown with two structural regions defining an annular cavity for air flow through the engine core. However, it will be appreciated that the flow passage can be adapted for other housings and cases as well. Also in this example embodiment, the recovered lubricant is shown as discharging along an aft axial face of FIC 46. However, it will be appreciated that the case can be adapted to redirect recovered lubricant toward a main return path disposed in any radial, axial, and/or circumferential orientation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A case comprises a radially inner case hub, a radially outer case section with an outer wall, a plurality of circumferentially distributed struts extending radially between the inner hub and the outer case section, and a lubricant scavenge passage disposed circumferentially apart from a bottom dead center (BDC) position of the case. The lubricant scavenge passage includes an inner scavenge section extending radially through a first one of the plurality of struts.

The case of the preceding paragraph can optionally include, additionally and/or alternatively, any one or more of the following features, configurations and/or additional components:

A case according to an exemplary embodiment of this disclosure includes, among other possible things, a radially inner case hub, a radially outer case section with an outer wall, a plurality of circumferentially distributed struts extending radially between the inner hub and the outer case section, and a lubricant scavenge passage disposed circumferentially apart from a bottom dead center (BDC) position of the case. The lubricant scavenge passage includes an inner scavenge section extending radially through a first one of the plurality of struts.

A further embodiment of the foregoing case, wherein the lubricant scavenge passage additionally and/or alternatively extends between a first inner port formed on the inner case hub and an outer port disposed outside the outer case section outer wall.

A further embodiment of any of the foregoing cases, wherein the strut bounding the lubricant flow passage additionally and/or alternatively is disposed between about 25° and about 65° apart from the BDC case position. A further embodiment of any of the foregoing cases, wherein the strut bounding the lubricant flow passage additionally and/or alternatively is disposed between about 40° and about 50° apart from the BDC case position. A further embodiment of any of the foregoing cases, wherein the lubricant scavenge passage additionally and/or alternatively is integrally cast with the case. A further embodiment of any of the foregoing cases, wherein the lubricant scavenge passage additionally and/or alternatively includes a conduit having a contiguous lubricant scavenge flow surface comprising an upper scavenge flow surface with a first curvature radius and a lower scavenge flow surface with a second curvature radius. A further embodiment of any of the foregoing cases, wherein the second curvature radius additionally and/or alternatively is less than the first curvature radius. A further embodiment of any of the foregoing cases, wherein the second curvature radius additionally and/or alternatively is substantially equal to the first curvature radius, the substantially equal first and second curvature radii defining an effective curvature radius of the contiguous lubricant scavenge flow surface. A further embodiment of any of the foregoing cases, wherein the conduit comprises a scavenge flow divider additionally and/or alternatively extending through at least a portion of the conduit between the first inner port and the first outer port. A further embodiment of any of the foregoing cases, wherein the inner port additionally and/or alternatively includes an oil scoop having an entrance along an inner surface of the inner hub, the entrance oriented tangentially away from the BDC case position. A further embodiment of any of the foregoing cases, wherein the outer port additionally and/or alternatively includes a discharge opening formed on an axial facing side of the case. A further embodiment of any of the foregoing cases, wherein the inner case hub additionally and/or alternatively is configured to support a geared architecture for a gas turbine engine. A further embodiment of any of the foregoing cases, wherein the inner port additionally and/or alternatively is configured to receive oil discharged from the geared architecture. A further embodiment of any of the foregoing cases, wherein additionally and/or alternatively a second one of the plurality of struts is disposed proximate the BDC case position, the second one of the struts being a hollow strut having a bore in fluid communication with a second inlet formed into the inner hub, the bore of the second one of the struts defining at least a portion of a sump cavity for a secondary oil system.

A lubricant scavenge passage comprises an inlet scoop, a scavenge outlet port, an inner scavenge section, and an outer scavenge section. The inlet scoop is formed on a radially inner case wall. The scavenge outlet port is disposed outward of a radially outer case wall. The inner scavenge section extends between the inlet scoop and the outer case wall. The outer scavenge section, in fluid communication with the inner scavenge section, extends between the outer case wall and the scavenge outlet port. The lubricant scavenge passage is disposed circumferentially apart from a bottom dead center (BDC) position of the case.

The lubricant scavenge passage of the preceding paragraph can optionally include, additionally and/or alternatively, any one or more of the following features, configurations and/or additional components:

A lubricant scavenge passage according to an exemplary embodiment of this disclosure includes, among other possible things, an inlet scoop, a scavenge outlet port, an inner scavenge section, and an outer scavenge section. The inlet scoop is formed on a radially inner case wall. The scavenge outlet port is disposed outward of a radially outer case wall. The inner scavenge section extends between the inlet scoop and the outer case wall. The outer scavenge section, in fluid communication with the inner scavenge section, extends between the outer case wall and the scavenge outlet port. The lubricant scavenge passage is disposed circumferentially apart from a bottom dead center (BDC) position of the case.

A further embodiment of the foregoing lubricant scavenge passage, wherein the strut bounding the lubricant scavenge passage additionally and/or alternatively is disposed between about 40° and about 50° away from the BDC case position.

A further embodiment of any of the foregoing lubricant scavenge passages, wherein the lubricant scavenge passage additionally and/or alternatively is integrally cast into the case. A further embodiment of any of the foregoing lubricant scavenge passages, wherein the inner scavenge section and the outer scavenge section additionally and/or alternatively define a scavenge conduit having a contiguous lubricant scavenge flow surface extending between the first inner port and the first outer port. A further embodiment of any of the foregoing lubricant scavenge passages, wherein the contiguous lubricant scavenge flow surface additionally and/or alternatively is configured to redirect lubricant scavenge flow from a tangential direction to an axial direction. A further embodiment of any of the foregoing lubricant scavenge passages, wherein the contiguous lubricant scavenge flow surface additionally and/or alternatively compises an upper scavenge flow surface with a first curvature radius and a lower scavenge flow surface with a second curvature radius. A further embodiment of any of the foregoing lubricant scavenge passages, wherein the second curvature radius additionally and/or alternatively is less than the first curvature radius. A further embodiment of any of the foregoing lubricant scavenge passages, wherein the second curvature radius additionally and/or alternatively is substantially equal to the first curvature radius, the substantially equal first and second curvature radii defining an effective curvature radius of the contiguous lubricant scavenge flow surface. A further embodiment of any of the foregoing lubricant scavenge passages, wherein the effective curvature radius additionally and/or alternatively is at least equal to or greater than an actual radius measured between a longitudinal axis of the case and the inner case wall. A further embodiment of any of the foregoing lubricant scavenge passages, wherein the scavenge conduit comprises a scavenge flow divider extending through at least a portion of the conduit between the first inner port and the first outer port. A further embodiment of any of the foregoing lubricant scavenge passages, wherein the lubricant scavenge passage additionally and/or alternatively is disposed circumferentially above a sump cavity for a secondary oil system. A further embodiment of any of the foregoing lubricant scavenge passages, wherein the sump cavity additionally and/or alternatively is disposed proximate the BDC position of the case.

The invention claimed is:

1. A case comprising:
   a radially inner case hub;
   a radially outer case section with an outer wall;
   a plurality of circumferentially distributed struts extending radially between the inner hub and the outer case section; and
   a lubricant scavenge passage disposed circumferentially apart from a bottom dead center (BDC) position of the case, the lubricant scavenge passage including an inner scavenge section extending radially through a first one of the plurality of struts; an inner port including an oil scoop having an entrance along the inner surface of the inner case hub, the entrance oriented tangentially away from the BDC case position.

2. The case of claim 1, wherein the lubricant scavenge passage extends between a first inner port formed on the inner case hub and an outer port disposed outside the outer case section outer wall.

3. The case of claim 1, wherein the strut bounding the lubricant flow passage is disposed between about 25° and about 65° apart from the BDC case position.

4. The case of claim 3, wherein the strut bounding the lubricant flow passage is disposed between about 40° and about 50° apart from the BDC case position.

5. The case of claim 1, wherein the lubricant scavenge passage is integrally cast with the case.

6. The case of claim 1, wherein the lubricant scavenge passage includes a conduit having a contiguous lubricant scavenge flow surface comprising an upper scavenge flow surface with a first curvature radius and a lower scavenge flow surface with a second curvature radius.

7. The case of claim 6, wherein the second curvature radius is less than the first curvature radius.

8. The case of claim 6, wherein the second curvature radius is substantially equal to the first curvature radius, the substantially equal first and second curvature radii defining an effective curvature radius of the contiguous lubricant scavenge flow surface.

9. The case of claim 6, wherein the conduit comprises a scavenge flow divider extending through at least a portion of the conduit between the first inner port and the first outer port.

10. The case of claim 1, wherein the outer port includes a discharge opening formed on an axial facing side of the case.

11. The case of claim 1, wherein the inner case hub is configured to support a geared architecture for a gas turbine engine.

12. The case of claim 11, wherein the inner port is configured to receive oil discharged from the geared architecture.

13. The case of claim 1, wherein a second one of the plurality of struts is disposed proximate the BDC case position, the second one of the struts being a hollow strut having a bore in fluid communication with a second inlet formed into the inner hub, the bore of the second one of the struts defining at least a portion of a sump cavity for a secondary oil system.

14. A lubricant scavenge passage comprising:
    an inlet scoop formed on a radially inner case wall;
    a scavenge outlet port disposed outward of a radially outer case wall;
    an inner scavenge section extending between the inlet scoop and the outer case wall; and
    an outer scavenge section in fluid communication with the inner scavenge section, the outer scavenge section extending between the outer case wall and the scavenge outlet port, the lubricant scavenge passage disposed circumferentially apart from a bottom dead center (BDC) position of the case.

15. The passage of claim 14, wherein the strut bounding the lubricant scavenge passage is disposed between about 40° and about 50° away from the BDC case position.

16. The passage of claim 14, wherein the lubricant scavenge passage is integrally cast into the case.

17. The passage of claim 14, wherein the inner scavenge section and the outer scavenge section define a scavenge conduit having a contiguous lubricant scavenge flow surface extending between the first inner port and the first outer port.

18. The passage of claim 17, wherein the contiguous lubricant scavenge flow surface is configured to redirect lubricant scavenge flow from a tangential direction to an axial direction.

19. The passage of claim 17, wherein the contiguous lubricant scavenge flow surface comprises an upper scavenge flow surface with a first curvature radius and a lower scavenge flow surface with a second curvature radius.

20. The passage of claim 19, wherein the second curvature radius is less than the first curvature radius.

21. The passage of claim 19, wherein the second curvature radius is substantially equal to the first curvature radius, the substantially equal first and second curvature radii defining an effective curvature radius of the contiguous lubricant scavenge flow surface.

22. The passage of claim 21, wherein the effective curvature radius is at least equal to or greater than an actual radius measured between a longitudinal axis of the case and the inner case wall.

23. The passage of claim 17, wherein the scavenge conduit comprises a scavenge flow divider extending through at least a portion of the conduit between the first inner port and the first outer port.

24. The passage of claim 14, wherein the lubricant scavenge passage is disposed circumferentially above a sump cavity for a secondary oil system.

25. The passage of claim 24, wherein the sump cavity is disposed proximate the BDC position of the case.

\* \* \* \* \*